F. BOHLENDER.
SAW SET.
APPLICATION FILED JULY 23, 1919.

1,333,828.

Patented Mar. 16, 1920.

INVENTOR.
Frederick Bohlender,
BY
ATTORNEY.

UNITED STATES PATENT OFFICE.

FREDERICK BOHLENDER, OF OREGON CITY, OREGON.

SAW-SET.

1,333,828.   Specification of Letters Patent.   Patented Mar. 16, 1920.

Application filed July 23, 1919. Serial No. 312,743.

*To all whom it may concern:*

Be it known that I, FREDERICK BOHLENDER, a citizen of the United States of America, and resident of Oregon City, in the county of Clackamas and State of Oregon, have invented certain new and useful Improvements in Saw-Sets, of which the following is a specification.

This invention relates to tools and particularly to saw-sets. An object of this invention is to produce a novel means whereby the saw setting guide may be moved and held in different positions of adjustment with relation to the tooth engaging member which is oscillated with relation to the guide so that teeth of saws may be acted on to bend the said teeth abruptly to increase the set or a modified action may be had by reason of the adjustment afforded for the guide.

A further object of this invention is to produce a saw-set having an adjustable member which will compensate so that the device can be used in connection with saws of different gages to insure that the saw shall be clamped firmly in place while the setting device is being operated.

The invention may also include means for insuring uniform action of the setting member so that it will be moved a predetermined distance at each operation of its actuating mechanism.

Figure 1:
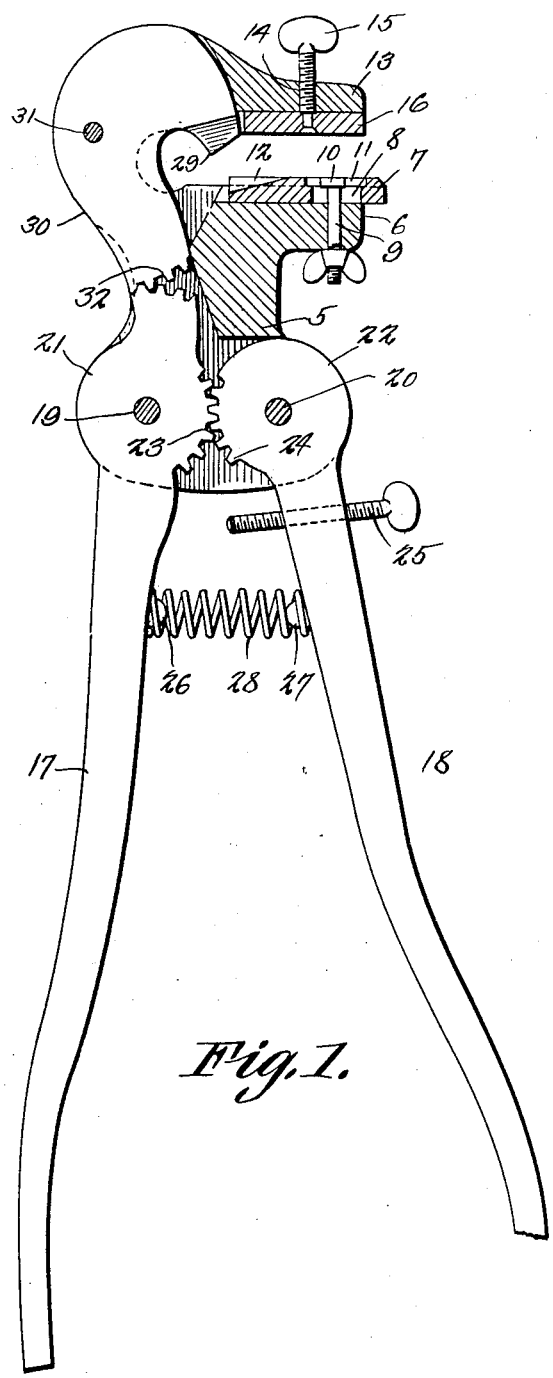

In describing the invention in detail reference will be had to the accompanying drawing forming a part of the specification wherein like characters denote corresponding parts in the several views and in which drawing, Figure 1 illustrates a sectional view of the saw-set, the operating mechanism thereof in elevation.

Figure 2:
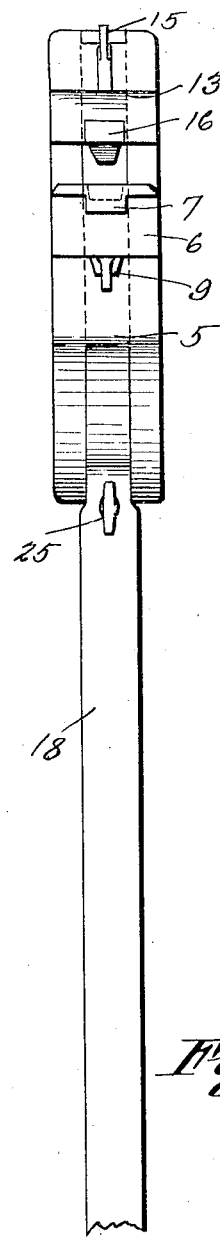

Fig. 2 illustrates the edge elevation of the said device.

In these drawings 5 denotes the body of the saw-set, 6 a base on which the movable plate 7 may be clamped at different positions of adjustment. The plate 7 has a slot 8 in it to receive a bolt 9 and the head 10 of the bolt rides on a shoulder 11 formed in the wall of the slot 8. Pressure is applied to the plate by the head of the bolt so as to hold it rigidly on the base.

The upper edge of the plate 7 at its inner edge is slotted as at 12 to create a clearance into which teeth of saws may be pressed by the setting member (to be hereinafter described) and it is the position of the plate 7 with relation to the base that determines whether the teeth of the saw have a long or short set with relation to the blade.

The jaw 13 is formed integral with the body and overlies the base and it is provided with threaded aperture 14 for the reception of the screw 15. The inner end of the screw is swiveled in a plate 16 which constitutes the clamping member of the jaw and the said plate 16 is adjustable by means of the screw with relation to the plate 7 so that saws of different thicknesses can be clamped effectively by threading the screw 15 in the jaw 13. Handles 17 and 18 are mounted on pivots 19 and 20 respectively and the said handles have heads 21 and 22 respectively. Teeth 23 of the head 21 mesh with the teeth 24 of the head 22 so that when the handles are oscillated and their outer ends are pressed together power applied to them will affect the operation of the setting device.

The handle 18 has a gage screw 25 threaded in it and the inner end of the said screw abuts the handle 17 so as to limit the movement of the handles toward each other and this screw terminates the throw of the setting member as will presently appear.

Lugs 26 and 27 projecting from the inner faces of the handles 17 and 18 form anchorages for a spring 28 which holds the handles apart and moves them apart when pressure has been removed from the handles during their manipulation.

The saw-setting plunger or hammer 29 is formed on the end of a lever 30 and the lever is mounted on a pivot 31 so that the saw-setting mechanism will be in operative relation to the plate 7. The lever 30 terminates at one end in a tooth segment 32 which is engaged by the tooth 23 of the head 21 and as the handle 17 is oscillated the lever 30 is oscillated and the setting member is moved into and out of engagement with the teeth of a saw carried by the plate 7 and held thereon, as stated, by the clamping member.

I claim:

1. In a saw-set, a body having a base, a plate slidable on the base, said plate having a slot, a shoulder formed on the wall of the slot, a bolt extending through the base and having its head engaging said shoulder, means for drawing the head of the bolt against the said shoulder for holding the plate at different positions of adjustment, a clamping member coacting with the plate for holding a saw at different positions thereon, said plate having a slot creating a clearance for saw teeth and means adapted to act on saw teeth for pressing them into the said slot.

2. In a saw-set, a body, a plate having a slot creating a clearance for saw teeth, means for holding the plate at different positions of adjustment, a clamping member coacting with the plate, means for holding the clamping member at different positions of adjustment, a saw-setting member comprising a lever, handles having heads pivotally mounted on the body interengaging teeth on the said heads, a tooth segment at the end of the lever and means for oscillatively mounting the said lever whereby the tooth segment thereof engages the teeth of one of the heads and the opposite end of said lever is in operative relation to the plate.

3. In a saw-set, a body having a base, a plate adjustable on the said base, means for holding the said plate at different positions, a clamping member for holding a saw on the said plate, handles, means for pivotally mounting the handles on the body, heads on the said handles having interengaging teeth, a saw-setting member consisting of a lever provided at one end with a tooth segment adapted to engage the teeth of one of the heads, the opposite end of the said lever terminating in a saw tooth engaging member at an angle with relation to the first mentioned end and means for pivotally mounting the said lever on the said body.

FREDERICK BOHLENDER.